June 15, 1937.  L. M. PERSONS  2,083,664

ROOM TEMPERATURE CONTROLLING SYSTEM

Filed July 26, 1934  2 Sheets-Sheet 1

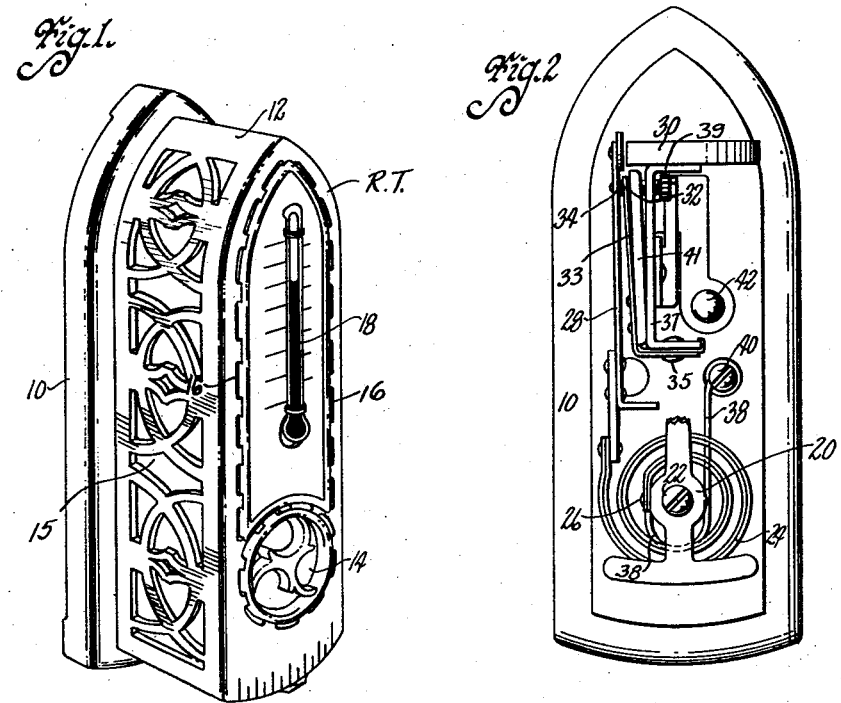

| BURNER OPERATION-HRS. | | R.T. at BASE BOARD | | | | R.T. at TABLE LEVEL | | | | R.T. at EYE LEVEL | | | |
|---|---|---|---|---|---|---|---|---|---|---|---|---|---|
| LEGEND | | O.T.= | 70° | 30° | 0° | O.T.= | 70° | 30° | 0° | O.T.= | 70° | 30° | 0° |
| B.L.= Breathing Level(5') | ½ | R.T.(Floor+8") | 70 | 69 | 68 | FLOOR | 70 | 68 | 66 | FLOOR | 70 | 66½ | 63 |
| C.T.L.= Constant Temperature Level | 1 | R.T.+1½'(C.T.L.) | 70 | 70 | 70 | T.L. (R.T.) | 70 | 69¼ | 68½ | T.L. | 70 | 68 | 66 |
| O.T.= Outdoor Temperature | 1½ | T.L. | 70 | 70½ | 71 | R.T.+1½'(C.T.L.) | 70 | 70 | 70 | B.L. (R.T.) | 70 | 69 | 68 |
| R.T.= Room Thermostat | 2 | B.L. | 70 | 72 | 74 | B.L. | 70 | 70½ | 71½ | R.T.+1'(C.T.L.) | 70 | 70 | 70 |
| T.L.= Table Level(2½') | 2½ | CEILING | 70 | 73½ | 77 | CEILING | 70 | 72½ | 75½ | CEILING | 70 | 71 | 72 |

Burner Operation Period
Idle Period

Witness
Edw. Seeley

Inventor:- Lawrence M. Persons
by Bair, Freeman & Sinclair
Attorneys

June 15, 1937.　　　　L. M. PERSONS　　　　2,083,664

ROOM TEMPERATURE CONTROLLING SYSTEM

Filed July 26, 1934　　　2 Sheets-Sheet 2

Inventor
Lawrence M. Persons
by Bair, Freeman, & Sinclair
Attorneys

Witness
Ray Rucker

Patented June 15, 1937

2,083,664

UNITED STATES PATENT OFFICE 2,083,664

ROOM TEMPERATURE CONTROLLING SYSTEM

Lawrence M. Persons, Des Moines, Iowa, assignor to Penn Electric Switch Co., Des Moines, Iowa, a corporation of Iowa Application July 26, 1934, Serial No. 737,057

2 Claims. (Cl. 236—68)

An object of my invention is to provide a room temperature controlling system of simple construction and arrangement, yet having inherent qualities for maintaining a constant temperature at any given level desired in a room.

A further object is to provide a room temperature controlling system which compensates for outdoor temperature by taking advantage of the fact that air stratification in a room is more pronounced in cold weather than it is at higher temperatures and utilizing a single room thermostat having inherent means to provide a negative differential which anticipates room temperature changes, prevents overruns in the operation of the burner and changes the length of the burner operations in proportion to outdoor temperature changes.

A further object of my invention is to provide a room temperature controlling system which maintains air temperature more uniform than is possible with ordinary room thermostats which operate entirely in response to room temperature changes even though the mechanical differential of such ordinary room thermostat is set at the lowest practical minimum.

A further object is to provide a room thermostat which by itself will control a burner so that a constant temperature level can be maintained in a room, the thermostat being located at a distance from said constant temperature level whereby it is responsive to temperature changes other than those at the constant temperature level as caused by air stratification, the room thermostat having inherent construction modifying its operation as compared to the operation of a room thermostat in response to room temperature only.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of a room thermostat embodying my invention.

Figure 2 is a front elevation of the same with the cover removed and an adjusting element broken off and removed to better illustrate details of construction of the room thermostat.

Figure 3 is a view similar to the lower portion of Figure 2 showing a different type of electrical connection.

Figure 4 is a view similar to Figure 3 showing an electrical connection of different size.

Figure 5 is a chart showing temperatures at various levels in a room when my room thermostat is used and placed at different levels, the room temperatures being set forth in relation to outdoor temperatures and the operating and idle periods of the burner being diagrammatically illustrated in relation to outdoor temperatures.

Figure 6:
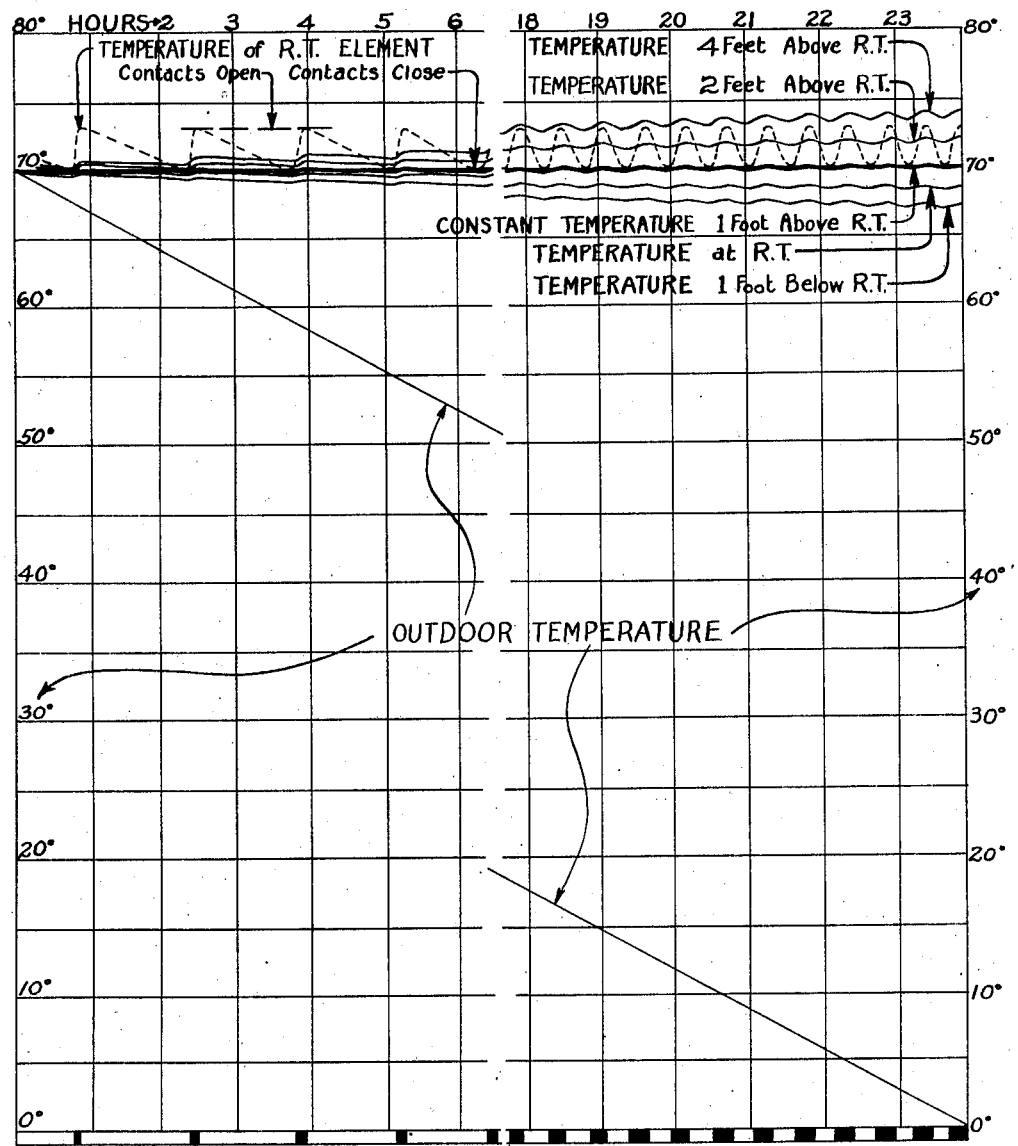
Figure 7:
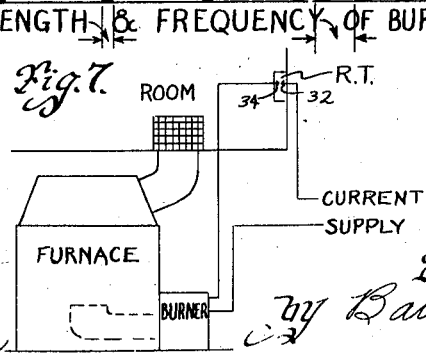

Figure 6 is a graphical chart showing the variations in temperature at different levels in a room compared with the temperature of the room thermostat element and in relation to outdoor temperature, the length and frequency of burner operations compared with outdoor temperature also being illustrated; and Figure 7 is a diagrammatic view showing the relation of my room thermostat to a burner and a room.

My room thermostat is indicated generally by the reference characters R. T. It includes a base 10 and a cover 12 therefor having air circulating openings 14, 15 and 16.

A thermometer 18 may be located on the exterior of the casing 12 if desired.

Within the casing 12, an adjusting arm 20 is pivoted on a pin 22, the pin being supported on the base 10. Any suitable means may be provided for swinging the arm 20 for adjustment purposes, such means being omitted from the drawings. The adjusting arm 20 has one end of a bimetal temperature responsive coil 24 anchored to it as indicated at 26. The other end of the temperature responsive element 24 carries an armature or switch arm 28. A permanent magnet indicated at 30 acts upon the armature 28 to provide snap action for the switch.

The contacts of the switch are indicated at 32 and 34. The contact 32 may be termed a stationary contact and is carried by a leaf spring 33. The leaf spring 33 is anchored at 35 to a stationary bracket 37 of the room thermostat.

The contact 34 may be termed a movable contact and is carried by the switch arm 28. An adjusting screw 39 is provided for engagement with a stiffening arm 41 of the leaf spring 33 to provide for changing the mechanical differential of the room thermostat by adjusting the contact 32 so that the armature 28 in the closed circuit position is nearer or farther with respect to the poles of the magnet 30.

Terminals 40 and 42 are provided for the stationary contact 32 and the movable contact 34, respectively. A flexible wire 38 connects the terminal 40 in Figure 2 with the anchored end of the temperature responsive element 24. The element 38 may be a piece of nichrome wire or any other suitable resistance wire and its sides and length are so designed with respect to the current to flow through the room thermostat when the burner is operating that it will provide a negative differential equal to substantially half the mechanical differential of the switch.

The negative differential is caused by heat radiated from the wire 38 raising the temperature of the element 24 whenever the circuit is closed for thereby hastening the closed circuit portion of the operating period of the burner. The current flowing through the element 24 itself also produces some heat for this purpose.

In Figure 3, I have shown a flexible connection at 44 commonly called a pig-tail, which can be substituted for the connection 38 in Figure 2 if the current to be carried is considerably heavier and if it is desired that the current does not flow through the element 24. Thus there is no heat generated in the element itself when the circuit is closed but only in the connection 44 which radiates heat to the element 24. In Figure 4, I show a pig-tail 46 which is smaller in diameter for increasing the heat produced by a current of the same value as that which flows through the pig-tail 44 of Figure 3, or producing the same amount of heat as that produced by the pig-tail 44 when the current for the room thermostat in Figure 4 is less than that for the room thermostat in Figure 3.

It is thus obvious that any degree of heating can be obtained by the connections 38, 44 or 46 to produce the desired negative differential for accomplishing the accurate control of room temperature as will hereinafter be set forth.

Referring to Figure 7, the circuit diagram for the room thermostat and burner is illustrated and it will be noted that the room thermostat is the only controller for the burner, although of course high temperature limit or safety controls can be added to the circuit if desired.

Having described the general character of the room thermostat I use in connection with my system, I will now describe how it effects the temperature control desired.

There has long been a need for improved means of room temperature control to allow regulation within closer limits than have heretofore been obtainable by room thermostats responsive to room temperature only. Automatic and intermittently fired heating systems have been devised which were seldom controlled within less than two or three degrees. These temperature variations, occurring as much as two or three times an hour, produce certain effects of discomfort on human beings, the reason for which being that although the human body can adjust itself to widely varying conditions of temperature if allowed sufficient time, it is sensitive to relatively small changes of temperature in short periods of time.

It has been my problem to devise a control to minimize these variations and thereby produce a higher degree of comfort without the necessity of a complicated costly room thermostat which is not adaptable to all types of heating systems.

Conventional thermostats have been found inadequate. They have been more or less satisfactory depending upon the sensitivity and adjustment of the instruments themselves and upon the skill of the installer in selecting a proper location. In practically all cases, a change of temperature of the thermostat parts, of from one to two degrees or more, was required in order to open and close the contacts. This has meant that for the thermostat to turn off the heating equipment there had to be an increase in the temperature of the thermostat parts of at least one or two degrees before the contacts were opened. This warming of the thermostat parts was accomplished only by an increase in the temperature of the air in the room.

After the burner was started, comparatively long operation was required before the heat generated at the boiler or furnace could be transmitted to the room in which the thermostat was located, and then transferred to the thermostat by air circulation. By the time the thermostat parts had been warmed the necessary one or two degrees there was an excessive amount of heat stored in the heating system which continued to pour into the room after the thermostat was satisfied and the burner stopped. The result was an overrun of room temperature and a long shutdown period of the burner.

During this shutdown period the heating plant and its distribution system lost the greater part of their stored heat so that when the thermostat again called for heat there was an underrun of room temperature, due to the time required to build up the temperature of the heating medium and re-establish circulation. This overrun and underrun of room temperature may be further explained by the fact that the thermostat and the wall on which it was mounted, heated and cooled at a slower rate than the air in the room. Thus, the action of the thermostat was caused to lag behind the actual changes of room temperature.

It is generally conceded that in all heating plants controlled by a conventional type of thermostat there was an overrun and underrun of room temperature which, when added to the differential of the thermostat, caused a wide variation of temperature in the room, in some cases as much as six or eight degrees.

It might be contended that it is only necessary to produce a thermostat having a sufficiently close differential, say one-half degree. I have proven this to be incorrect, however, by experimenting with a thermostat having less than one-fifth degree differential.

Any control which requires that the element receive an increase in temperature by a change in room temperature being transmitted to it, in order to open the contacts, allows overrun and underrun. Such a thermostat is also unduly influenced by wall lag. While it is possible to obtain a closer room differential than with conventional thermostats, in some cases as close as one and one-half degrees, this is not satisfactory.

In the study of this problem it was evident that a thermostatic switch actuated by room temperature alone could not provide accurate control due to the inherent time lag. I sought means whereby the instrument could anticipate the trend of room temperature change and thereby open or close the contacts before any appreciable change took place. The thermostat illustrated on my drawings produced this result and it has proved to be the simplest, yet most effective method. It is essentially a time switch in which the length and frequency of the burner operations are varied by the room temperature.

Instead of depending on a change of room temperature to affect the thermostatic element one or two degrees and actuate the contacts, control is obtained by converting the normal current flow through the thermostat itself into heat.

This heat provides the change in temperature necessary for the thermostatic element to open the contacts without waiting for a change in room temperature. In other words, instead of allowing the room temperature to vary in order to actuate the thermostat, the temperature of the thermostat is varied in order to hold the room temperature constant.

The action of my room thermostat may be explained in a simple manner as follows. Assuming that a downward trend of temperature carries the room temperature to the setting of the instrument, the contacts close and the burner is started. The current flow immediately starts to heat the thermostatic element. When the element has been raised in temperature sufficiently to equal the mechanical differential, the contacts open and stop the burner. With the current flow interrupted, the heating effect stops and the thermostatic element loses its heat and again approaches room temperature, causing the contacts to again close and start the burner when the room temperature is low enough.

The result is a continuation of operating cycles in which the period of burner operation and standby are so accurately regulated that they enable the heating system to coast along and deliver just enough heat to maintain practically unvarying room temperature.

The slightest trend of room temperature up or down affects the absorption or dissipation of heat within the thermostat and causes a corresponding shortening or lengthening of the burner operation.

As the length of burner operation is increased on a trend of room temperature downward, the standby period is decreased and the heating system soon changes the trend of room temperature. It is interesting to note that by the use of my room thermostat the trend of room temperature change may be reversed before the change has progressed but a small fraction of one degree Furthermore, these slight changes may occur slowly over a period of an hour or more so that there is no effect on human comfort. In comparison with the relatively rapid change of several degrees which is experienced with the conventional thermostat, it may be said that for practical purposes my room thermostat maintains the room temperature at a constant level.

My room thermostat simulates the smooth application of heat produced by modulation or high-low flame but without the complications and loss of combustion efficiency usually experienced with these methods. The full capacity of the burner, which may be adjusted for maximum economy, is applied to each operation.

Since it is not necessary to quickly build up circulation and temperature in order to actuate the thermostat, my room thermostat makes possible some reduction in the rate at which fuel is supplied to the burner. This usually results in fuel economy.

It is recognized that various types of heating systems—hot water, steam, warm air, or vapor—may require longer or shorter burner operations in order to produce satisfactory results. This condition has been met by providing the adjusting screw 39 whereby the mechanical differential of the room thermostat may be changed to give in conjunction with the heaters 38, 44 or 46 shorter or longer burner operations which may be required for each installation. Once the room thermostat has been adjusted to a particular application to give uniform temperature control, no further adjustments are necessary. The same accurate control is maintained in all weather conditions at a constant temperature level which is somewhat above the room thermostat location.

Since the room thermostat is only slightly dependent upon room temperature for satisfactory operation, it may be placed in locations which have rather poor air circulation and yet provide accurate control.

It, therefore, offers a wider range of possible locations, an advantage which is greatly appreciated by installers and home owners.

Heating engineers have long realized the importance in terms of maximum comfort of accurate temperature regulation in the zone from the floor to an elevation of about four feet. It is in this four foot zone that people expect greatest comfort while seated or in a reclining position. It is also true that temperature and conditions of air motion are quite variable at lower levels; there is a more pronounced physical effect from temperature changes on the lower extremities of the body; and temperatures vary near the floor in accordance with outside weather.

Heretofore it has been customary to locate the thermostat at approximately eye level due to the fact that frequent adjustment was necessary to produce comfort as weather conditions varied. Also, because of the necessity for good air circulation over the thermostatic element and because of the convenience in reading the thermometer usually associated with the thermostat, it was located at eye level.

There are several exclusive advantages in having the thermostat mounted at a low level in the room as below enumerated:

1. The most uniform temperature and comfort may be maintained under all conditions of weather with the same setting of the room thermostat.

2. My thermostat, when so mounted, compensates for the effect of downward drift in room temperature with lowering outside temperature.

3. The thermostat is less likely to be affected by sources of heat such as human beings, radios, floor lamps, etc.

4. A room thermostat, when mounted in a low position, is less conspicuous, yet can be made more attractive and is less likely to interfere with the decorative scheme or arrangement of the room. As a result, it is easier to find a suitable location acceptable to the home owner.

With respect to the automatic compensation for weather changes, it is not only important that the lower levels in a room be maintained at a more uniform temperature for maximum comfort, but also that the average temperature in the four foot zone be comfortable with all weather. This desirable result is obtained by mounting my room thermostat at a low level. As the weather becomes colder, that part of the four foot zone above the constant temperature level increases in temperature to offset the tendency to feel chilly resulting from the lowered temperature at the floor.

The average temperature in this zone is increased. This result is only obtained automatically by a low mounting of the temperature regulator.

The chart of Figure 5 indicates the temperatures resulting at various levels in a room with the room thermostat located at baseboard, table level and eye level, in houses in which the temperature difference between floor and ceiling is approximately ten degrees when the outside temperature is zero. Many houses have a greater difference between floor and ceiling under extreme conditions, in some cases as much as twenty degrees.

If unduly large differences exist, it is well to avoid locating the room thermostat at the extreme low level. Instead of locating it at the baseboard, about two feet above the floor I have found to be a better location and recommend that the thermostat be located at the baseboard level only when the temperature difference between floor and ceiling is ten degrees or less with the thermometer at zero outside.

This chart has been compiled from actual experiences I have had while measuring the temperatures at the different levels with sensitive recording thermometers.

It will be noted, regardless of the position of the room thermostat, there is a constant temperature level some distance above it, this level being about a foot and a half above the room thermostat when mounted at the baseboard or at table level and about a foot above the room thermostat when mounted at eye level.

The burner operation and idle periods are indicated and these are of substantially the same length and frequency for either mounting of the thermostat. With the outdoor temperature at seventy degrees, the burner does not operate. With the outside temperature at thirty degrees, it operates about seven and one-half minutes each forty-five minute period, while at zero outside, it operates about ten minutes at twenty minute intervals. The burner operations are shorter and more frequent with my type of room thermostat than with the ordinary type controlled by room temperature alone but the overall operating period of the burner is slightly less in a given period of time, thus indicating that there is a saving of fuel effected.

Another evidence of fuel economy is indicated because users report that they find it possible to operate at one to two degrees below the average operating temperature which they formerly carried with the conventional type of thermostat.

This is because the room thermostat eliminates overruns and in addition maintains a constant temperature at the desired level. Combustion efficiencies may be maintained at high levels due to maintenance of more uniform draft in a coal fired furnace, while in the case of oil burners, higher average refractory temperatures may be produced in the combustion chamber. It should be noted that with oil burners there is a practical lower limit to the length of burner operation, but my room thermostat maintains constant temperature with burner cycles sufficiently long to provide high combustion efficiency, and the length of the cycle is easily adjustable by the adjustment at 39 to compensate for any unusual condition.

Frequent and short cycles of the burner operation which my room thermostat produces maintain the circulation and temperature of the heating medium much more constantly than the conventional thermostat. As a result, distribution of heat throughout the entire system is improved and the effect of friction, unbalanced piping, and unusual heat losses from the piping are minimized.

In Figure 6, it will be noted that the temperature responsive element 24 of the thermostat operates on a differential of about 3°, that is, it opens the switch contacts at about 73° and closes them at about 70°. This is illustrated by a dotted line.

It is evident that if the room temperature alone controlled the room thermostat, when 70° in the room is reached, the parts of the thermostat and the wall adjacent the thermostat might still be a little below 70° so that there would be a time lag before the thermostat responded to the room temperature, during which time the room temperature would decrease and finally when the temperature of the element 24 becomes 70°, the contacts would close. The temperature in the room would still coast downwardly slightly because of the time lag in the burner getting the heat to the room which would cause an underrun.

Likewise, at the high temperature end of the room thermostat cycle, the room temperature would have to be above 73° before the contacts would open and heat would still be sent up from the burner after they were opened, causing an overrun so that in warm weather the differential might be 4° or 5° instead of 3° at which the room thermostat is set. In colder weather, the differential would be proportionally greater.

With the heater 38, 44 or 46, however, in the circuit of the room thermostat when 70° is reached, the contacts close, whereupon the heater causes a comparatively fast warping of the element 24 toward contact opening position so that the fact that the room temperature will rise because of the burner operation is anticipated long before it actually does rise to the 73° level.

Accordingly, the contacts open in a longer or shorter period of time depending on the differential setting of the room thermostat and the burner is shut off so that the room temperature starts receding.

A substantially constant temperature however is maintained at a level between one and one-half feet above the room thermostat. Due to air stratification, the temperature varies below and above the constant temperature level. Since a room thermostat at the constant temperature level could not act as a controller because the temperature does not change appreciably, it is obvious that the thermostat could not be located at this level. Since there is air stratification, the thermostat could be located either above or below the constant temperature level because the temperature would change at these points due to operating and idle periods of the burner.

Above the constant temperature level, however, is not the place to locate the room thermostat because in cold weather stratification is more marked and the temperature above the constant temperature level is higher than at the constant temperature level. Accordingly, the colder the weather, the warmer would be any position above the constant temperature level and a room thermostat located at this point would give less operation instead of more as desired.

Below the constant temperature level the reverse is true—the colder the weather, the lower the temperature below the constant temperature level.

By locating the thermostat below the level at which constant temperature is desired, automatic compensation for outdoor temperatures is secured. The lower the outdoor temperature, the lower will the temperature at the room thermostat tend to be and accordingly the oftener the room thermostat will respond to operate the burner. Accordingly, the length of the burner operations is increased and the frequency of the burner operations is also increased during colder weather as indicated by the shaded sections at the bottom of Figure 6, this being proportional to the outdoor temperature line graphically indicated.

The heater in the room thermostat naturally has residual heat after the circuit is opened by separation of the contacts 32 and 34. When the burner operations are more frequent, there is greater residual heat carried over from one operation to the next, thus lengthening the burner operations and making the room thermostat more quickly responsive to slight temperature changes. The result is a substantially constant temperature about a foot above the room thermostat as indicated by the heavy line in Figure 6, regardless of outdoor temperature.

I have found that a negative differential of about a degree and a half is the most satisfactory, although this may be increased or decreased by changing the mechanical differential.

A comfortable level for people in lying or sitting positions, which are the most common in a living room, is with the room thermostat located just below table level. With the room thermostat located at table level, the constant temperature level is about the four foot level.

All the advantages outlined are obtained by designing the heater 38, 44 or 46 with respect to the current carried so that a negative differential of about half the mechanical differential is obtained. Both rising and lowering room temperatures are thus anticipated so that overruns and underruns are reduced to a minimum at any constant temperature level desired.

Some changes may be made in the construction and arrangement of the parts of my system without departing from the real spirit and purpose of my invention, and it is my intention to cover by my claims, any modified forms of structure or use of mechanical equivalents, which may be reasonably included within their scope.

I claim as my invention:

1. In a room thermostat, switch contacts for opening and closing a burner circuit, a temperature responsive element for effecting switch opening and closing operation of said contacts with a predetermined mechanical differential, means for moving said temperature responsive element for changing its range of adjustment, terminals for said contacts, one of said contacts being mounted on said temperature responsive element and movable therewith and a flexible connection between one of said terminals and said movable contact resisting flow of electric current to produce heat affecting the operation of said temperature responsive element when current flows through said switch contacts, said flexible connection being of such size and length as to produce a negative differential of substantially one-half said mechanical differential.

2. In a room thermostat, switch contacts for opening and closing a burner circuit, a temperature responsive element for effecting switch opening and closing operation of said contacts with a predetermined mechanical differential, means for moving said temperature responsive element for changing its range of adjustment, terminals for said contacts, and an electrical connection between one of said terminals and one of said contacts resisting flow of electrical current to produce heat affecting the operation of said temperature responsive element when current flows through said switch contacts, said electrical connection being of such size and length as to produce negative differential of substantially half said mechanical differential.

LAWRENCE M. PERSONS.